United States Patent [19]

Kamimura et al.

[11] Patent Number: 5,025,377
[45] Date of Patent: Jun. 18, 1991

[54] POSITION DETECTOR FOR MOVING VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 442,371

[22] Filed: Nov. 28, 1989

[30] Foreign Application Priority Data

Dec. 12, 1988 [JP] Japan .................................. 63-313539

[51] Int. Cl.$^5$ ............................................ G06F 15/50
[52] U.S. Cl. ................................ 364/424.02; 364/449; 180/169
[58] Field of Search ....................... 364/424.01, 424.02, 364/443, 449; 180/167 S, 168, 169; 318/587

[56] References Cited

U.S. PATENT DOCUMENTS

| | | | |
|---|---|---|---|
| 4,119,900 | 10/1978 | Kremnitz | 318/587 |
| 4,328,545 | 5/1982 | Halsall et al. | 364/424.02 |
| 4,710,020 | 12/1987 | Maddox et al. | 356/1 |
| 4,796,198 | 1/1989 | Boultinghouse et al. | 364/513 |
| 4,942,531 | 7/1990 | Hainworth et al. | 364/424.02 |
| 4,947,324 | 8/1990 | Kamimura et al. | 364/424.02 |

Primary Examiner—Thomas G. Black
Attorney, Agent, or Firm—Pollock, Vande Sande and Priddy

[57] ABSTRACT

A position-detecting system for a moving vehicle whose working efficiency is increased through the reduction of the frequency of interruption during traveling due to missing of a reference point comprises a light-receiving means installed rotatably on the moving vehicle and receiving light beam signals from a plurality of reference points, a means for detecting the azimuths of the reference points with respect to the advance direction of the moving vehicle based on light-receiving intervals, a first operating means for operating the position and the advance direction of the moving vehicle on the basis of preset positional information as well as the azimuths of the four reference points, a second operating means for operating the position and the advance direction of the moving vehicle on the basis of preset positional information and the azimuths of any three reference points out of the four reference points, and a switching means to select either one of the outputs from the first and second operating means.

5 Claims, 13 Drawing Sheets

POSITION DETECTOR FOR MOVING VEHICLE

BACKGROUND OF THE INVENTION

1. Field of the Invention

The present invention relates to a position detector for a moving vehicle, and more particularly to a position detector for traveling a moving automobile, an unmanned mobile and carrying device in a factory, or a steering vehicle for use in agriculture, civil engineering machinery and the like along a predetermined traveling course.

2. Description of the Prior Art

Heretofore, as a system for detecting a present position of a moving body such as the moving vehicles as described above, there has been proposed a system provided with a means for scanning a light beam emitted from a moving body in the circumferential direction or every azimuthal directions centering around the moving body, light-reflecting means for reflecting to return the light beam in the direction of incident light and secured at least three positions apart from the moving body, and a beam receiver means for receiving light reflected from the light-reflecting means (the Japanese Patent Laid-open No. 67476/1984).

In the above mentioned prior art, differential azimuths between adjoining two of three light-reflecting means centering around the moving body are detected on the basis of received beam output of the light-receiving means, then a position of the moving body is operated based on the detected differential azimuths and positional information of the light-reflecting means which have been previously set In such a prior art system, if a moving body having a beam-receiving means mounted thereon is positioned in the neighborhood of the central portion of a triangle with the respective light-reflecting means secured at the three positions as the vertexes, the position of the moving body can be detected with a fairly high precision. However, there was a problem that, in a position apart from the neighborhood of the central portion of the triangle, it was difficult to obtain a high measuring precision.

As a countermeasure therefor, for instance, as described in U.S. application Ser. No. 413,934 (Japanese Patent Application No. 262191/1985) or the Japanese Patent Laid-open No. 14114/1985 or No. 15508/1985, there have been proposed methods for measuring the position of a moving body wherein reference points are set on the vertexes of a quadrangle surrounding the area in which the moving body travels, optimum three reference points of the four reference points with which a high measuring precision can be expected are selected, and the positional detection of the moving body is performed on the basis of the positional information of the selected three reference points and the azimuths of the reference points viewed from the moving body.

Furthermore, U.S. application Ser. No. 413,935 (Japanese Patent Application Serial No. 63-257912) discloses a system for detecting the position and advance direction of a moving body (hereinafter referred to as "moving vehicle") in which differential azimuths defined between two reference points disposed at diagonal positions among four reference points viewed from the moving vehicle are calculated on the basis of the azimuths defined by the four reference points with respect to the advance direction of the moving vehicle, and then, the position and the advance direction of the moving vehicle are detected based on the azimuths defined by the four reference points, the differential azimuth defined between two reference points, and obtained positional information of the respective reference points.

In the above described system, however, there have been a case where the light beam cannot be projected on light-reflecting means disposed at the reference points because of tilt or vibration of the moving vehicle and/or a case where a light-receiving means installed on the moving vehicle receives light reflected from an object other than the above described light-reflecting means. If the reflected light of the light beam cannot be positively received by the light-receiving means, a position of the moving vehicle is erroneously calculated, and as a result the moving vehicle cannot be allowed to travel along a predetermined course.

There is described in U.S. application Ser. No. 07/420,063 (US89A: Japanese Patent Application Serial No. 63-262192) a detecting system which is so constructed that an azimuth of a missed reference point is presumed in the case of missing the reference points due to an inability to receive reflected light, and a position of the moving vehicle is then calculated by using the azimuth angle of the presumed reference point.

In the above technique wherein a position of a moving vehicle is calculated by presuming the azimuth of a reference point, errors as a result of presumptions are accumulated with the increase of the missing number of times, so that accurate positional detection may not be attained. For this reason, it has been also proposed that, for example, travel of the moving vehicle is allowed to stop when the counted missing number of times exceeds a predetermined number of times. In this respect, however, most of the cases in which a reference point is missed are tentative phenomena. Accordingly, if a moving vehicle is allowed to frequently stop to interrupt its working because of such tentative phenomena, the working efficiency decreases.

SUMMARY OF THE INVENTION

An object of the present invention is to provide a position-detecting system for a moving vehicle by which working efficiency of the moving vehicle is increased through reduction of the frequency of interruption during traveling of the moving vehicle due to missing of a reference point as much as possible.

The first aspect of the present invention resides in such a construction in a position-detecting system for a moving vehicle wherein a position and an advance direction of the moving vehicle are detected on the basis of received beam signals derived from the light beam emitted from light-emitting means disposed at four fixed reference points positioned apart from the moving vehicle and positional informations of the respective reference points comprising a light-receiving means installed rotatably in the horizontal direction on the moving vehicle and receiving the light beam signals, a means for detecting azimuths of the reference points with respect to the advance direction of the moving vehicle based on light-receiving intervals of the light-receiving means, a first operating means for operating the position and the advance direction of the moving vehicle on the basis of preset positional information as well as the azimuths of the four reference points, a second operating means for operating the position and the advance direction of the moving vehicle on the basis of preset positional information and the azimuths as to any three reference points out of the four reference points, and a switching means to select either one of the outputs from the first and second operating means, and in that when a light beam signal from one of the four reference points was not detected by the light-receiving means, an output from the second operating means is selected by the switching means to calculate a position as well as an advance direction of the moving vehicle based on the positional information and the azimuth of the three reference points other than the above described one reference point.

In addition to the first aspect, the second aspect of the present invention resides in that the system includes further a light radiation means rotating together with the light-receiving means on the moving vehicle, and a means for emitting a light beam from each of the reference points is a light-reflecting means which reflects the radiated light from the light radiation means along the incident direction thereof.

In accordance with the present invention having the construction as described above, when a received beam signal from one of the reference points disposed at four positions is not detected, in other words, even if any one of the reference points is missed, a position of a moving vehicle can be detected without any interruption based on positional informations as well as azimuths of the remaining three reference points other than the reference point missed. Accordingly, the moving vehicle can be continuously traveled so that there is no need of interrupting the work.

BRIEF DESCRIPTION OF THE DRAWINGS

FIG. 4 constituting

FIG. 5 constituting

FIG. 6 constituting

DETAILED DESCRIPTION OF THE PREFERRED EMBODIMENTS

Figure 10:
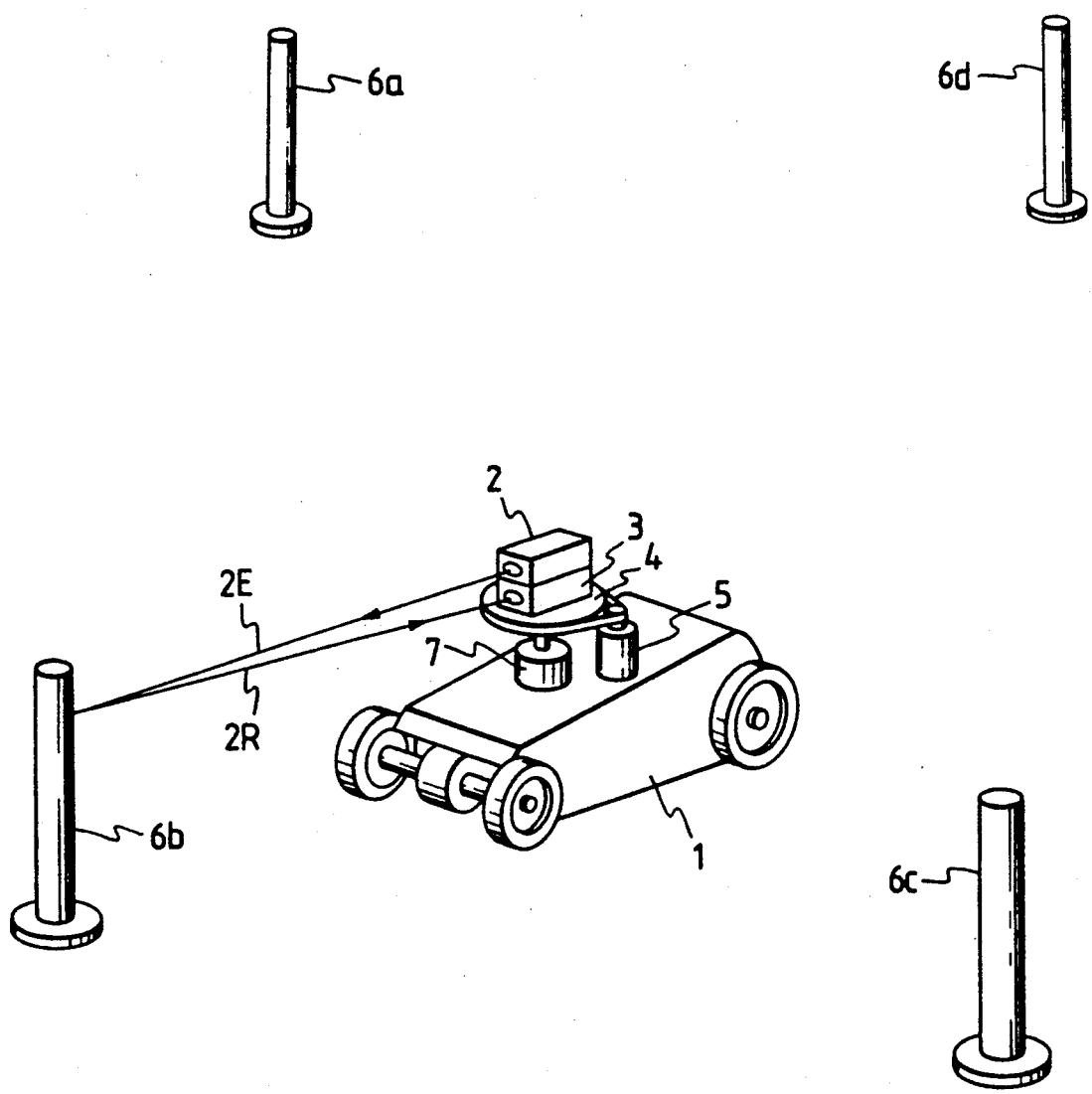
FIG. 10 is a perspective view showing a situation of arrangement of the moving vehicle and reflectors.

An embodiment of the present invention will be described hereinbelow by referring to the accompanying drawings. FIG. 10 is a perspective view showing a state of arrangement in respect of a moving vehicle carrying the control system according to the present invention and four light reflectors disposed in an area in which the moving vehicle travels.

In FIG. 10, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting a light beam 2E and a beam receiver 3 for receiving light 2R reflected by each of the reflectors 6a–6d for reflecting the light beam 2E. The beam source 2 is provided with a light beam emitting means (light-emitting diode) and the beam receiver 3 is provided with a means for receiving incident light to convert it into an electrical signal (photo-diode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a–6d are located around a working area of the moving vehicle 1. Each of the reflectors 6a–6d has a reflection surface reflecting incident light in the incident direction and for this purpose, a so-called corner cube prism which has been conventionally available on the market and the like may be used.

Next, the construction of the control system in the present embodiment will be described in accordance with the block diagrams of FIGS. 1 and 2 wherein the light beam 2E emitted from the beam source 2 is scanned in a rotating direction of the rotating table 4 and the light beam 2E is reflected by one of the reflectors 6a–6d. The light beam 2R reflected by the one of the reflectors 6a–6d is introduced into the beam receiver 3.

In a counter 9, the number of pulses output from the rotary encoder 7 is counted in accordance with rotation of the rotating table 4. The count value of the pulses is transferred to a discrimination processing means 11 in every reception of the reflected light beam in the beam receiver 3. In the discrimination processing means 11, an azimuth of each reflector 6 with respect to the advance direction of the moving vehicle 1 is calculated on the basis of the count value of the pulses transferred in every reception of the reflected light beam.

Actual azimuths detected by the discrimination processing means 11 and a presumed azimuth in the case where a reference point is missed (the details of such presumed azimuth will be described hereinbelow) are inputted to a diagonal differential azimuth operating means 37 and a first position-advance direction operating means (hereinafter referred to simply as "first operating means") 34 as well as an adjoining differential azimuth operating means 10 and a second position-advance direction operating means (hereinafter referred to simply as "second operating means") 13 through a switching means 36.

The switching means 36 is switched in response to the presence of a reference point-missing signal "d" output from the discrimination processing means 11. In FIG. 1, such a situation in Which the signal "d" is output, and as a result the switching means 36 is switched to the side of the adjoining differential azimuth operating means 10 as well as the second operating means 13 is illustrated.

In the diagonal differential azimuth operating means 37, differential azimuths defined between each pair of the reflectors 6 disposed at diagonal positions, respectively, among the reflectors 6 placed at four positions viewed from the moving vehicle 1 are operated. In the first operating means 34, the coordinates of a current position of the moving vehicle 1 are calculated on the basis of the above described differential azimuths and at the same time the advance direction of the moving vehicle 1 is calculated on the basis of the azimuths of the four reflectors 6.

Furthermore, differential azimuths defined between two reflectors 6 adjoining with each other among the three reflectors out of four are operated in the adjoining differential azimuth operating means 10. In the second operating means 13, coordinates of a current position of the moving vehicle 1 are calculated on the basis of the above differential azimuths and the advance direction of the moving vehicle 1 is simultaneously calculated based on the azimuths defined by the three reflectors 6 out of four. The three reflectors 6 mentioned above mean the three reflectors 6 other than the single reflector 6 disposed at the reference point missed.

The results of the operations in the first operation means 34 and the second operation means 13 are inputted to a comparing means 25. In the comparing means 25, data indicating a traveling course set in a traveling course setting means 16 are compared with the coordinates and the advance direction of the moving vehicle 1 obtained in the first operation means 34 or the second operating means 13.

The comparison results are supplied to steering means 14, and a steering motor (M) 35 connected to front wheels 17 of the moving vehicle is driven on the basis of the above-mentioned comparative results. An angle of steering for the front wheels 17 driven by the steering motor 35 is detected by means of a steering angle sensor 15 mounted on the front wheels of the moving vehicle 1, and fed back to the steering means 14.

A driving means 18 controls starting and stopping of an engine 19 as well as operation of a clutch 20 for transmitting the power of the engine 19 to rear wheels 21.

Figure 1:
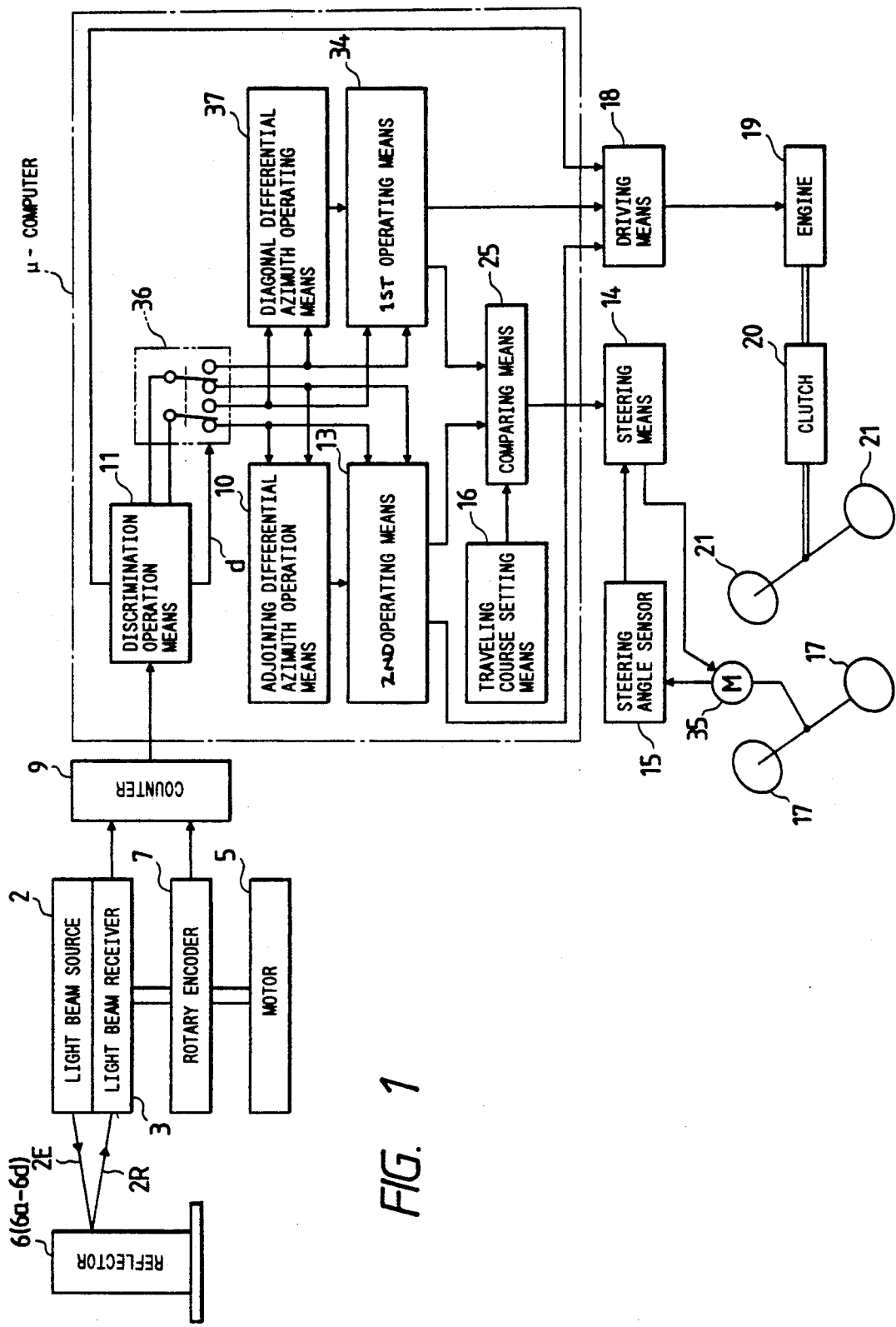
FIG. 1 is a block diagram showing an embodiment of the present invention.

Incidentally, of the structural elements shown in FIG. 1, the portion surrounded by a chain line may be constructed by a microcomputer.

Next, the detailed construction of the discrimination processing means 11 will be described hereinbelow. In the discriminating processing means 11, the azimuths are found and at the same time, discriminating and missing processings for the light beam reflectors 6 are carried out on the basis of the azimuths.

Figure 2:
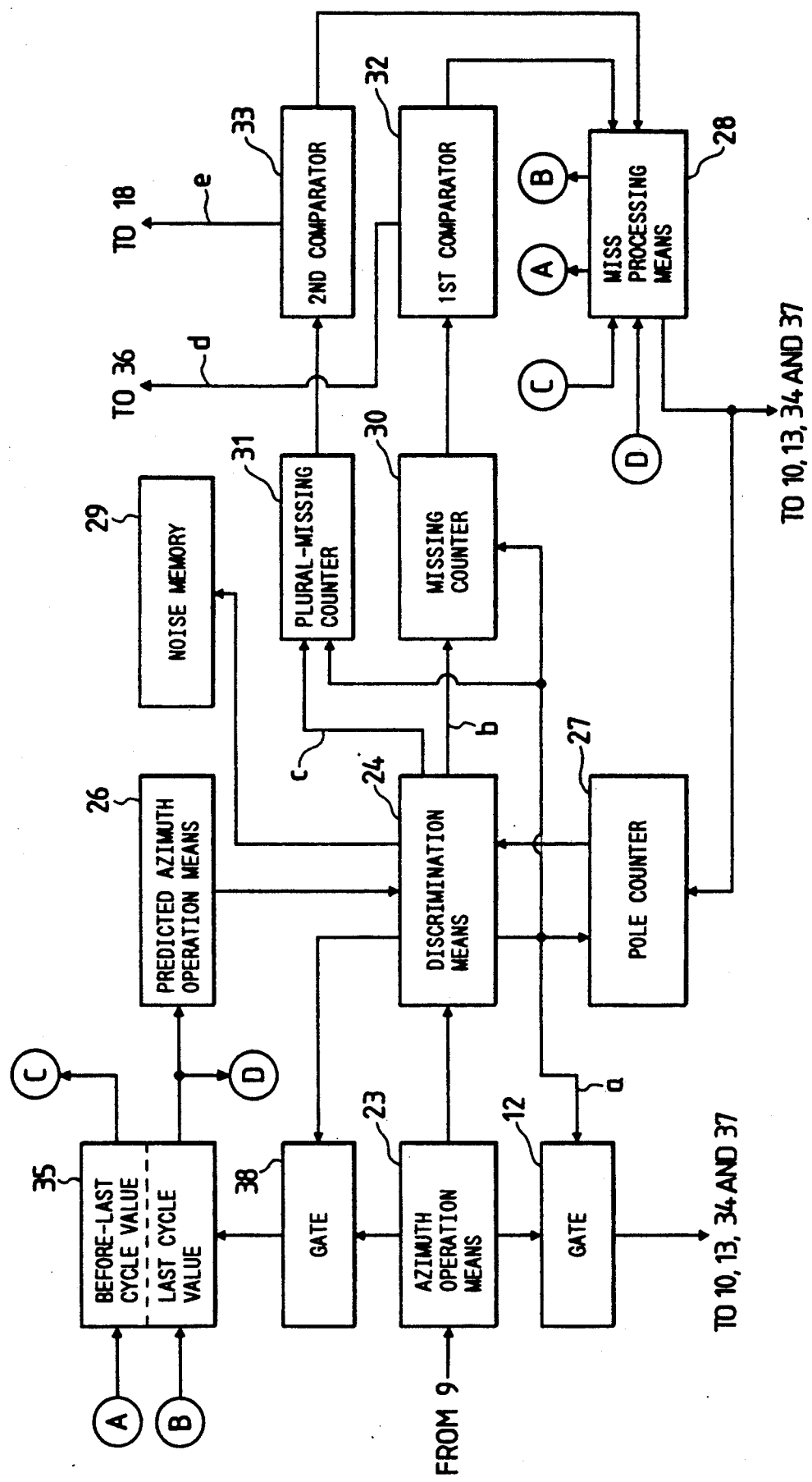
FIG. 2 is a detailed block diagram showing a discrimination processing means of FIG. 1.

Referring to FIG. 2, the azimuths of the respective reflectors 6 are operated with respect to the advance direction of the moving vehicle 1 on the basis of a count value of the counter 9 in the azimuth operating means 23. In an azimuth storing means 35, one azimuth for a certain reflector 6 which is detected in the last cycle as well as another azimuth for the same reflector 6 which has been detected in the before-last cycle are stored.

More specifically, a pair of azimuths which were detected in the last and the before-last detection cycles are stored in the storing means 35 in each respect of the azimuths 8a–8d for the reflectors 6a–6d located at reference points A–D, respectively. Based on the last azimuth, a predictive azimuth which is to be detected in respect of some particular reflector 6 in the next step is operated in a predictive azimuth operating means 26 wherein the predictive azimuth has a predetermined range.

In the discrimination means 24, the predictive azimuth is compared with the actual azimuth which has been operated by the azimuth operating means 23.

A pole counter 27 is so constructed that each of the count values is renewed by such a count value which corresponds to each of the reflectors 6 disposed at the reference points A, B, C and D in every detection thereof. Then, the count values of the pole counter 27 are inputted to the discrimination means 24, and compared with predetermined numerical values, respectively, which have been set in the discrimination means 24.

In accordance with a comparative result of the predictive azimuth with the actual azimuth in the discrimination means 24 as well as a comparative result of the count values in the pole counter 27 with the predetermined numerical values, it is judged whether or not a signal detected in the beam receiver 3 is a real detection signal of the reflected light from the expected reflector 6.

In the case when the reflected light from the expected reflector 6 is detected, a gate 12 is opened in response to a signal output "a" from the discrimination means 24, and as a result the actual azimuth is inputted to the diagonal differential azimuth operating means 37 and the first operating means 34 or the adjoining differential azimuth operating means 10 and the second operating means 13 through the switching means 36.

On the contrary, when it is judged that the detection signal in the beam receiver 3 is one from a reflector other than the expected reflector 6, the count value in a missing number counter 30 is increased by a signal "b" as a result of having missed the expected reflector 6.

In the case when two of the expected reflectors 6 have been serially missed, a count value is renewed in a plural missing number counter 31 in response to a signal "c". When the detection signal in the beam receiver 3 is a signal from something other than one of the reflectors 6, the signal is processed as noise, and a position of the moving vehicle 1 at the time of receiving the noise and an azimuth of a noise source viewed from the moving vehicle 1 are stored in a noise storing means 29.

The count value in the counter 30 is compared with a first threshold value T1 in a first comparing means 32, while the count value in the counter 31 is compared with a second threshold value T2 in a second comparing means 33. In the case where the count values of the missing number are less than the threshold values in both the comparing means 32 and 33, a processing for estimating an actual azimuth is effected in a miss processing means 28 on the basis of the last and the before-last azimuths stored in the azimuth storing means 35.

After being processed by the miss processing means 28, the last and the before-last azimuths in the azimuth storing means are renewed.

Furthermore, when the missing number of times exceeds the threshold value T1, the signal "d" is output to the switching means 36, whereby the switching means 36 is switched to the situation illustrated in FIG. 1.

On the one hand, when plural missing number of times exceeds the threshold value T2, a signal "e" is output to the driving means 18 to stop travel of the moving vehicle 1.

Since the missing of two reference points is more serious than missing only one reference point as to precision in positional detection of the moving vehicle 1, a smaller number of times than that of the threshold value TI is set as the threshold value T2. It is arranged that if adjoining two reference points ar missed, the moving vehicle 1 is stopped at once at the time when the plural missing number of times exceeds the threshold value T2.

On the other hand, in the case of missing only one reference point, it is arranged that the position and the advance direction of the moving vehicle 1 are operated on the basis of positions and azimuths of the reflectors 6 disposed at the three reference points other than the missing reference point when the missing number of times exceeds the threshold value T1.

When it is judged by the discrimination means 24 that light reflected from the expected reflector 6 is received, the signal "a" is output, whereby the number of times "0's" are reset in the missing number counter 30 and the plural missing number counter 31, respectively.

A value in the pole counter 27 is renewed in the case when it is judged by the discrimination means 24 that the expected reflector 6 has been normally detected as well as the case when missing processing has been completed. In the case when the expected reflector 6 has been normally detected, a gate 38 is opened, and the last azimuth and the before-last azimuth in the azimuth storing means 35 are renewed by the latest azimuth and the last azimuth, respectively.

Figure 7:
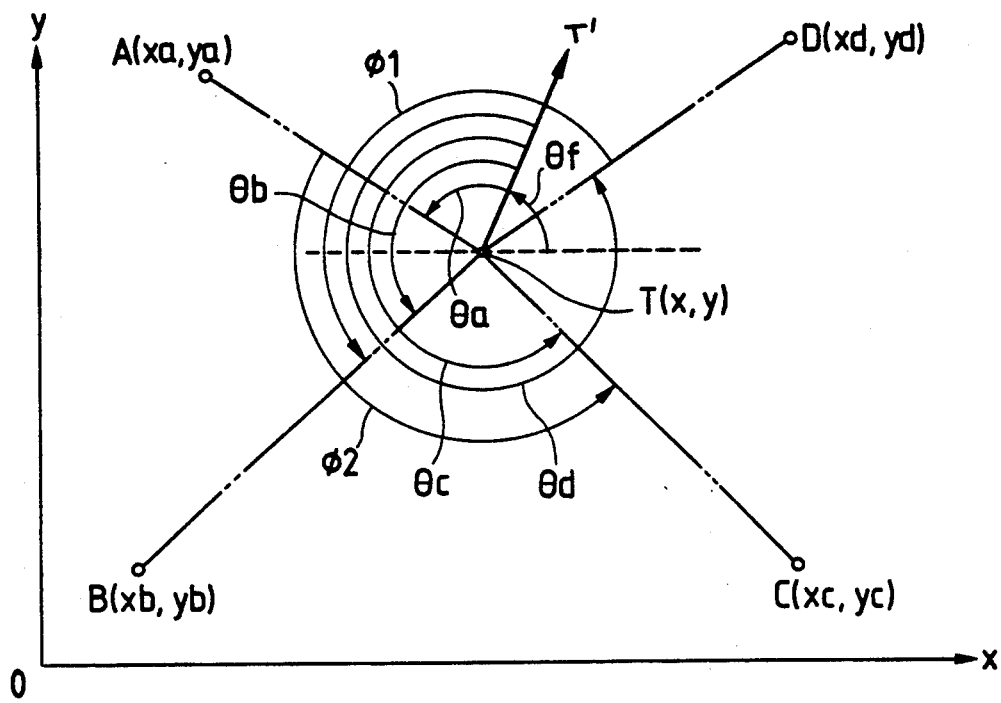
FIGS. 7 and 8 are explanatory graphical representations, respectively, for showing the relationship between the advance direction of the moving vehicle and azimuths of the reference points and differential azimuths.
Figure 8:
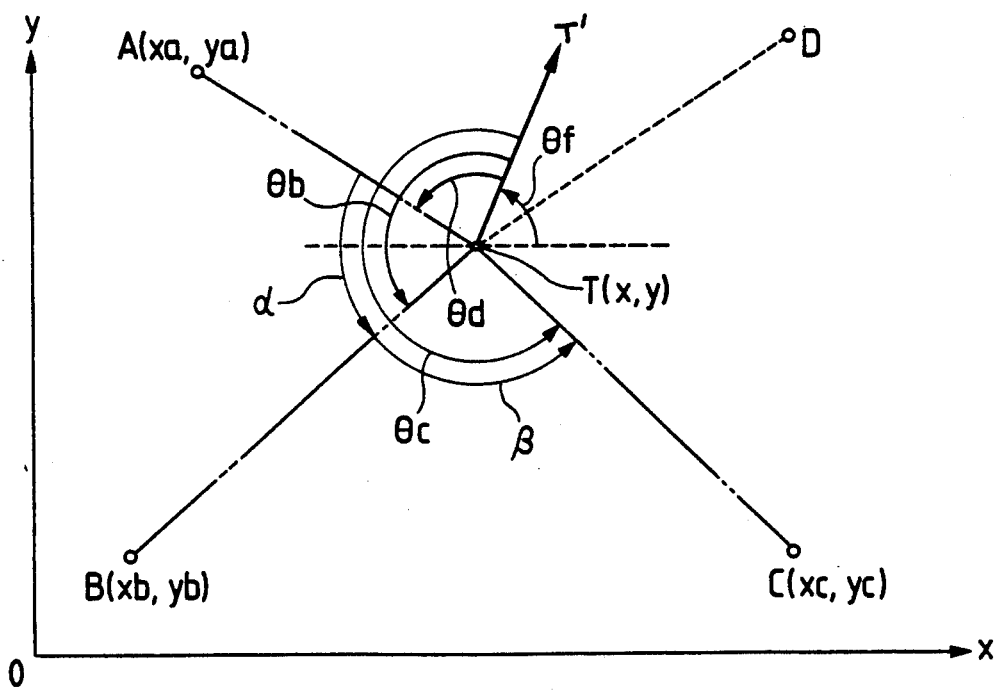

FIGS. 7 and 8 are explanatory graphical representations each showing the position T of the moving vehicle 1 and the positions of the reflectors 6 in a coordinate system for indicating a working area of the moving vehicle 1.

In FIGS. 7 and 8, the disposed positions of the reflectors 6a–6d are indicated by points A–D (hereinafter referred to as "reference points A, B, C and D"). In these figures, the positions of the reference points are represented by an x-y coordinate system. The current position of the moving vehicle 1 is T(x, y) and its advance direction with respect to the x-axis is $\theta f$.

Azimuths of the reference points A, B, C and D with respect to the advance direction of the moving vehicle 1 are designated by $\theta a$, $\theta b$, $\theta c$ and $\theta d$, respectively, and differential azimuths defined between reference points positioned at the respective diagonal positions are designated by $\phi 1$ and $\phi 2$, respectively.

FIG. 8 shows relationships between the remaining three reference points A, B and C in the case of missing one reference point (reference point D in the same figure) and the moving vehicle 1, respectively, in which reference characters $\theta a$, $\theta b$ and $\theta c$ denote the azimuths of the respective reference points A, B and C with respect to the advance direction of the moving vehicle 1, and $\alpha$ and $\beta$ denote differential azimuths defined between adjoining reference points A and B as well as B and C, respectively.

A formula for calculating a position T (x, y) and an advance direction $\theta f$ of the moving vehicle 1 based on the above described azimuths $\theta a$, $\theta b$, $\theta c$ and $\theta d$ as well as the differential azimuths $\phi 1$ and $\phi 2$ is stored in the first operating means 34, while another formula for calculating a position T (x, y) and an advance direction $\theta f$ of the moving vehicle 1 based on the above described azimuths $\theta a$, $\theta b$ and $\theta c$ as well as the differential azimuths $\alpha$ and $\beta$ is stored in the second operating means 13. An example of the formula to be stored in the first operating means 34 and that of the second operating means 13 are described in detail in U.S. application Ser. No. 413,935 (Japanese Patent Application Serial No. 63-257912) as well as U.S. application Ser. Nos. 344,574 and 362,630 now U.S. Pat. No. 4,947,324, respectively. Accordingly, the explanation therefor will be omitted herein.

Figure 3:
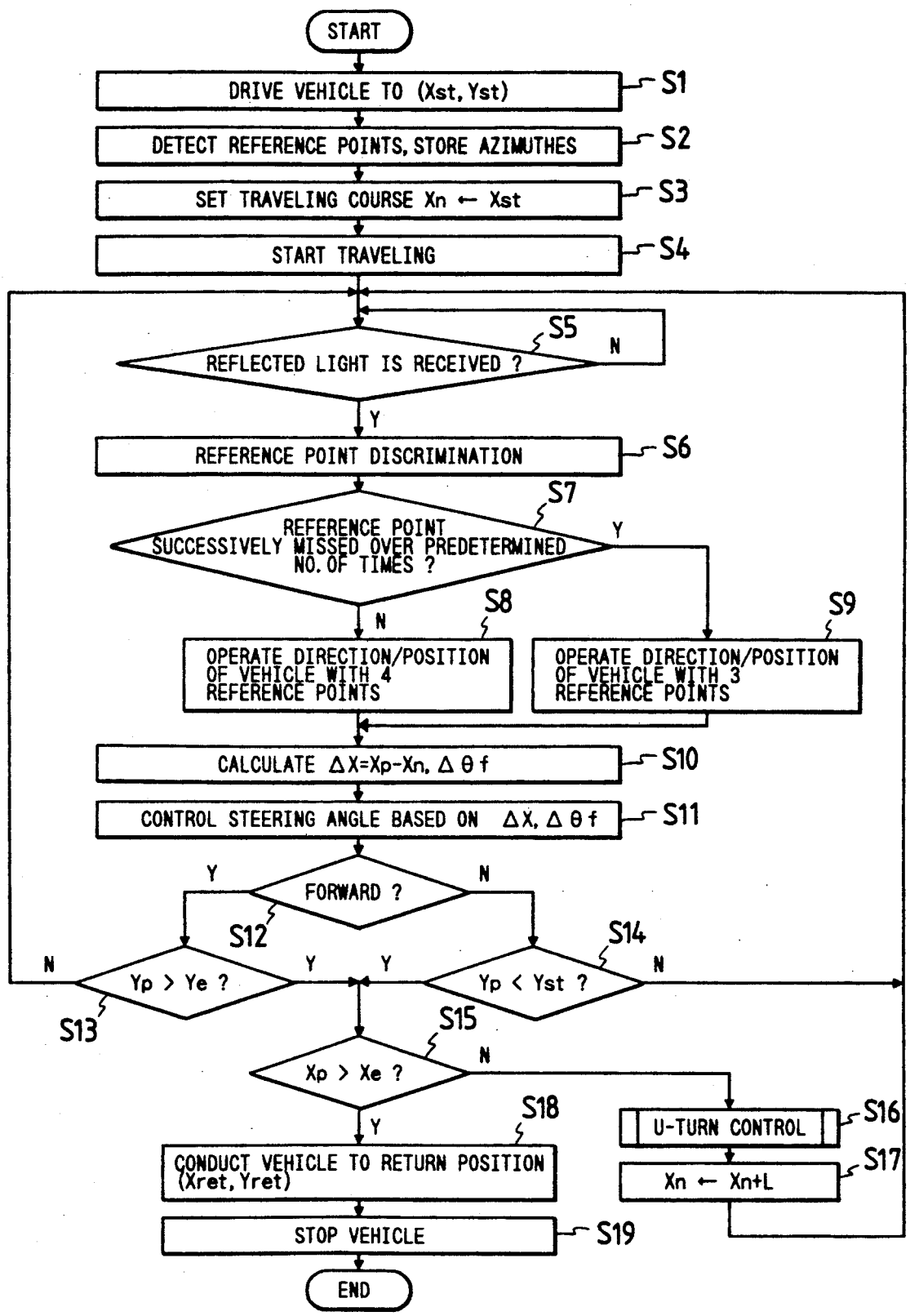
FIG. 3 is a flowchart showing a steering control.
Figure 4A:
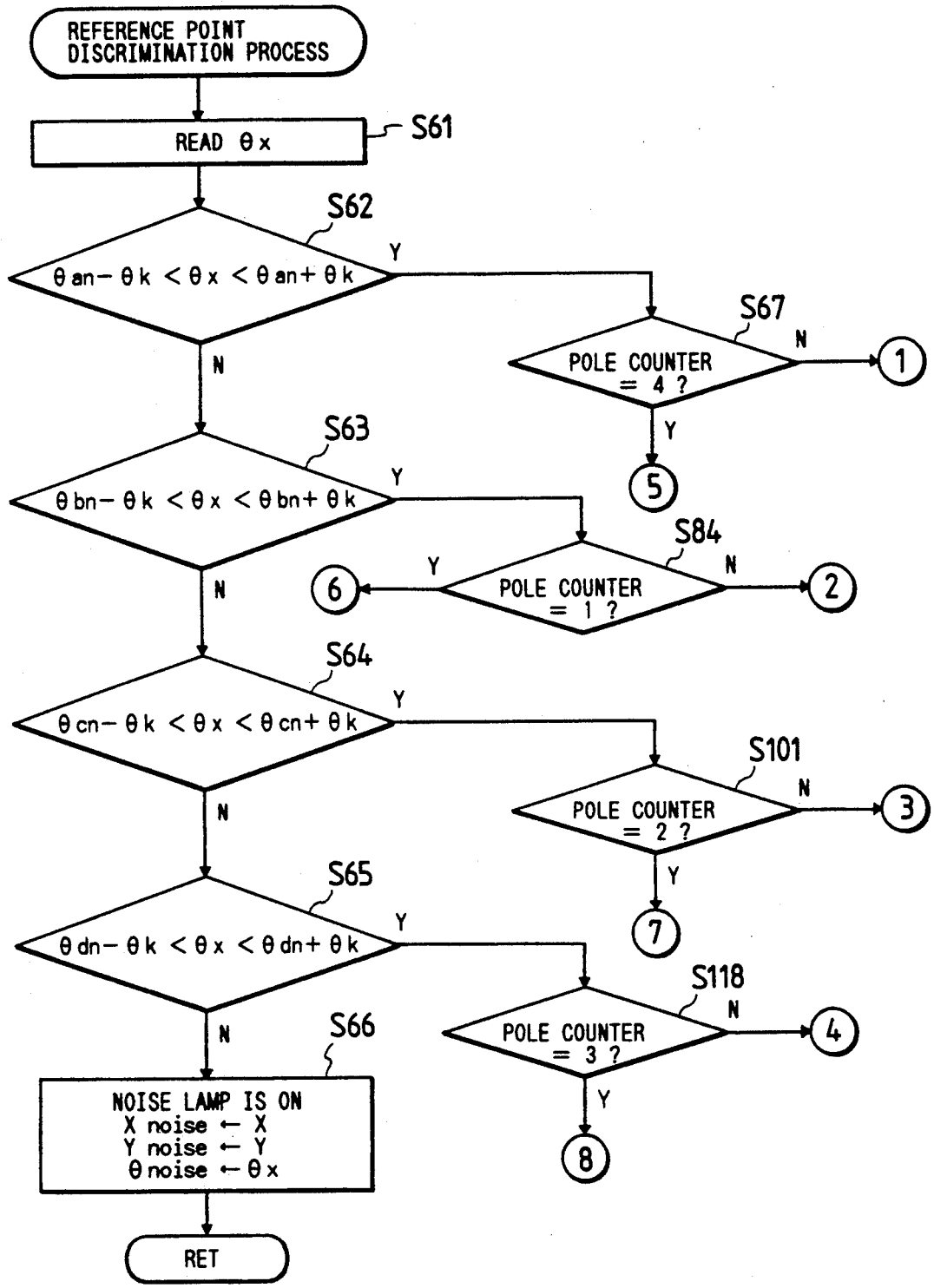
FIGS. 4A-4E is a flowchart showing a processing for discriminating reference points.
Figure 4B:
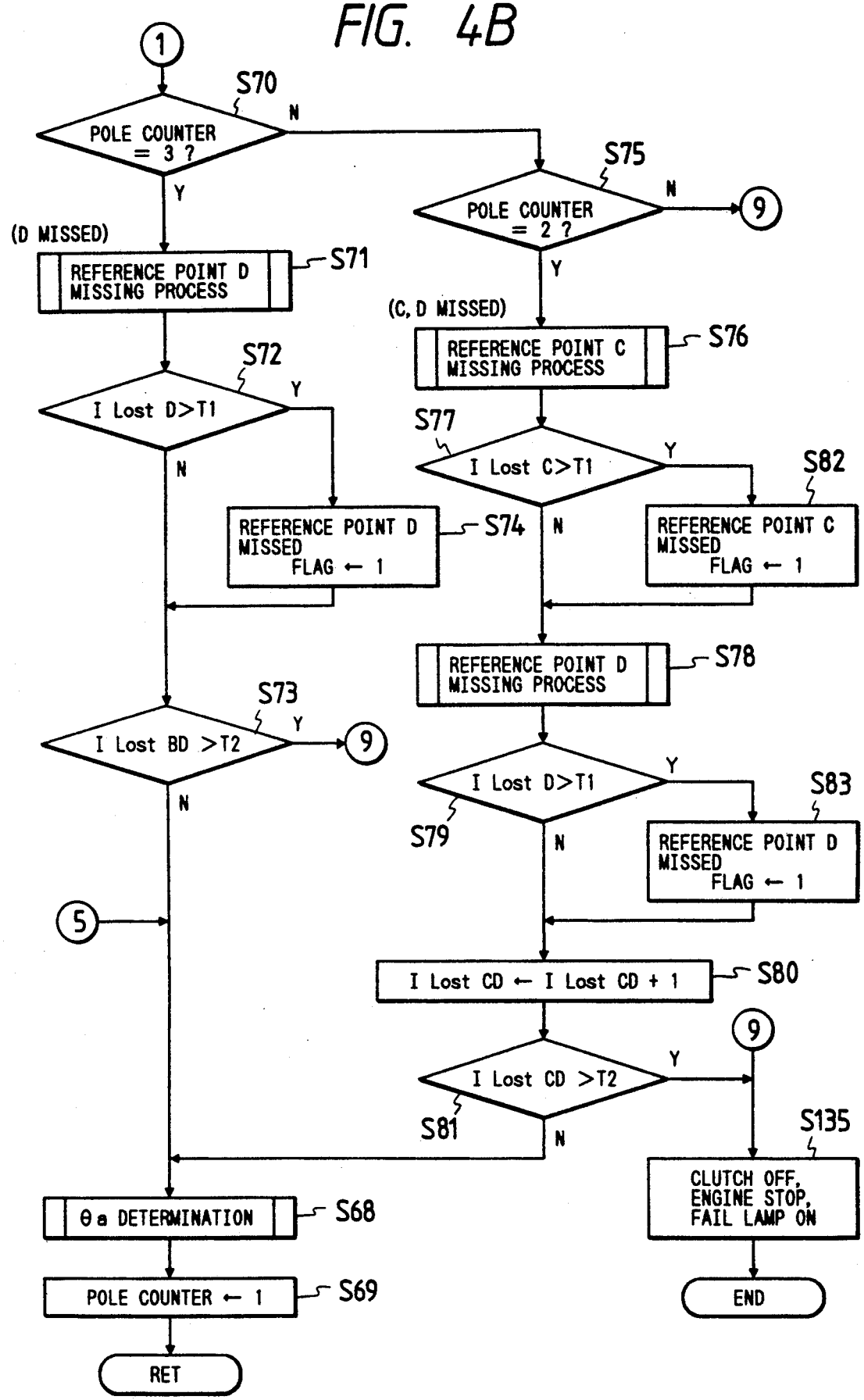
Figure 4C:
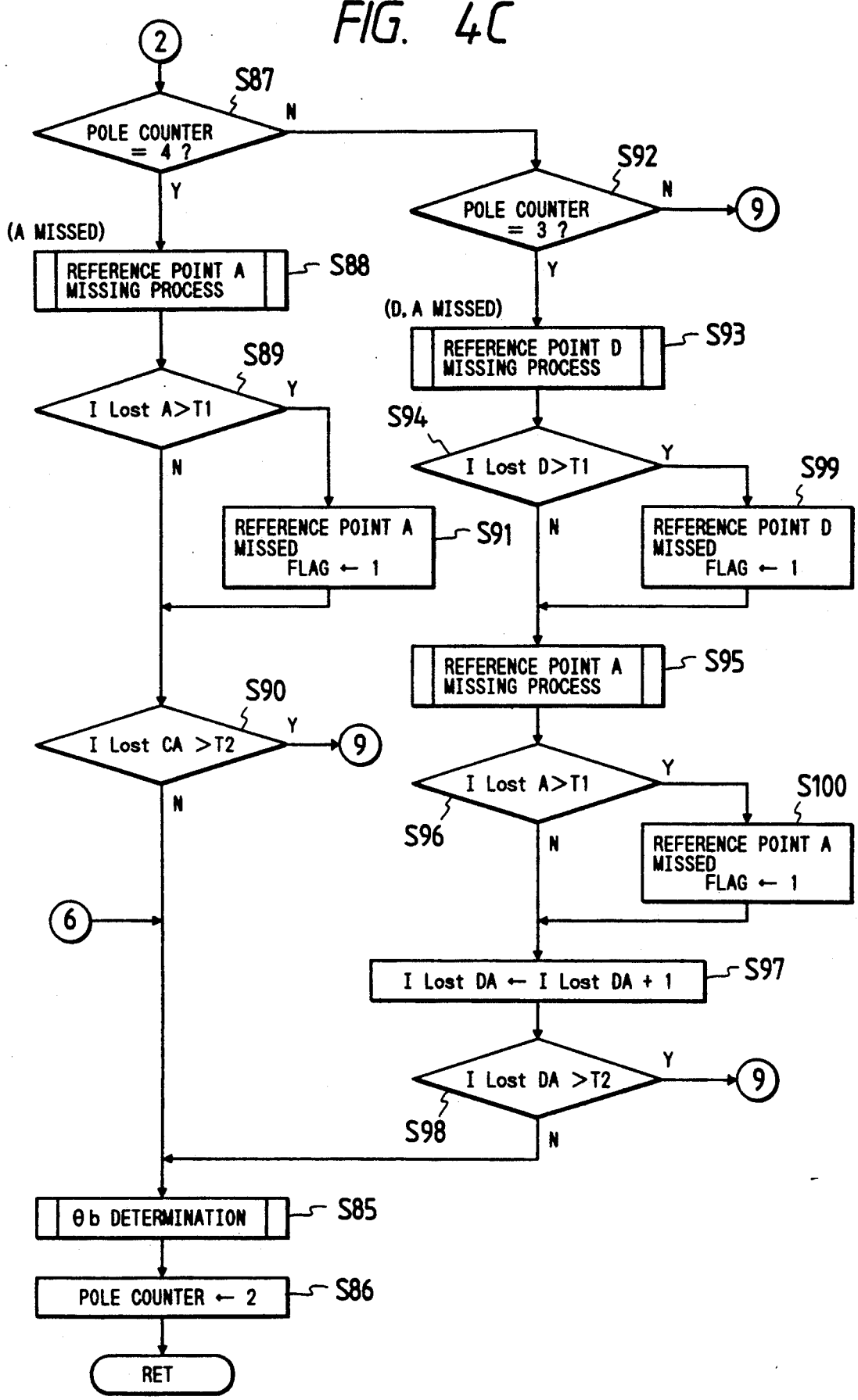
Figure 4D:
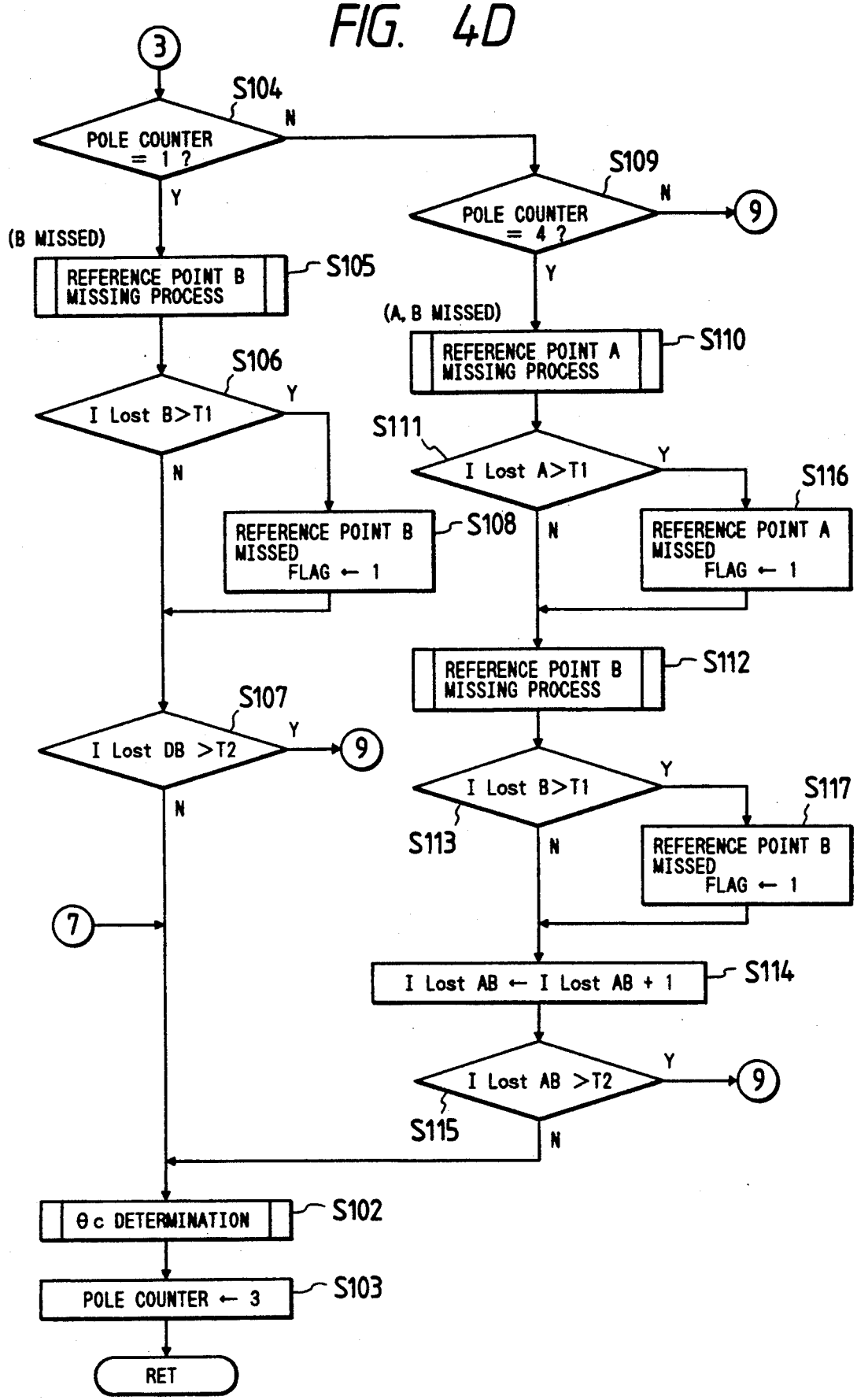
Figure 4E:
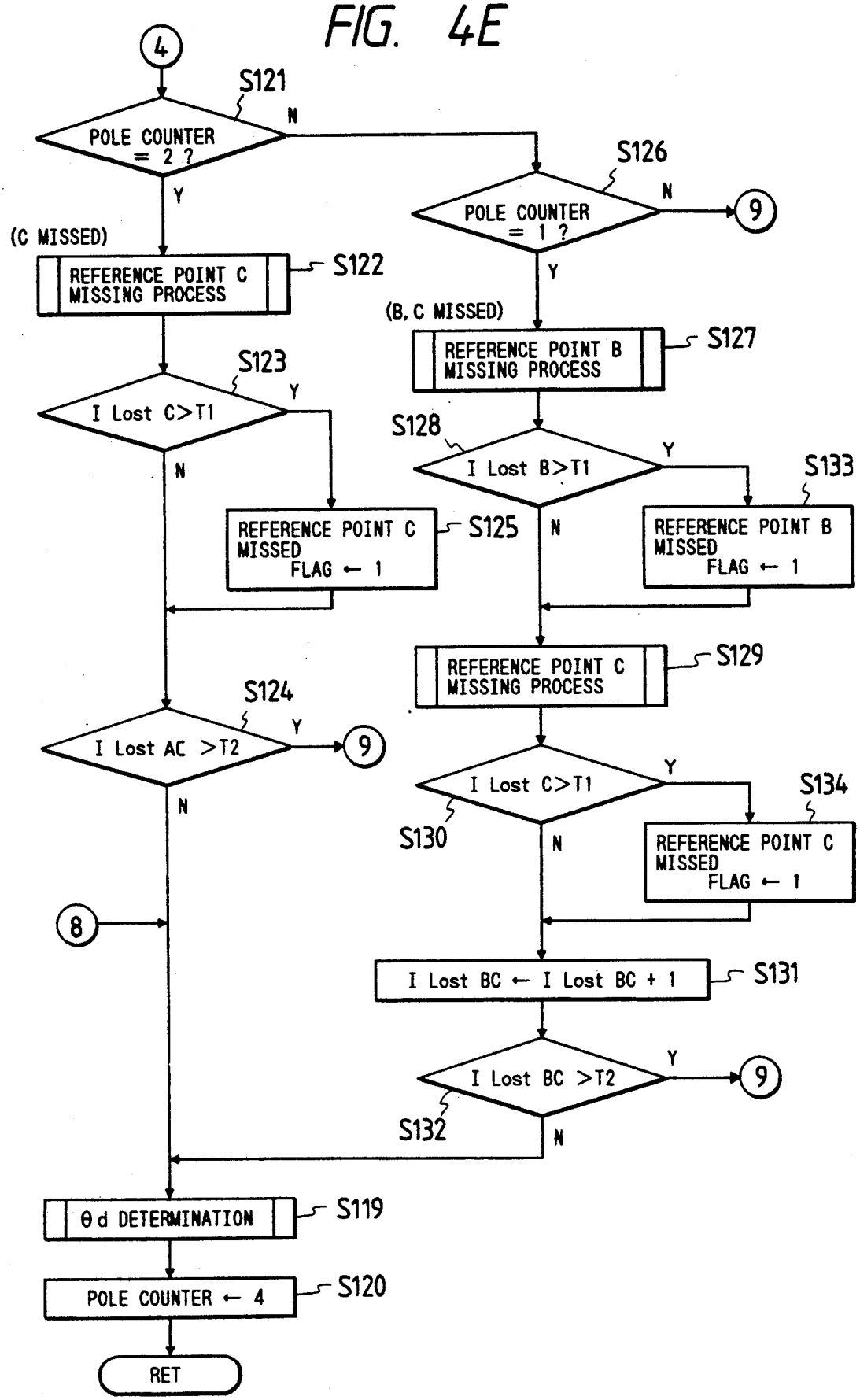
Figure 9:
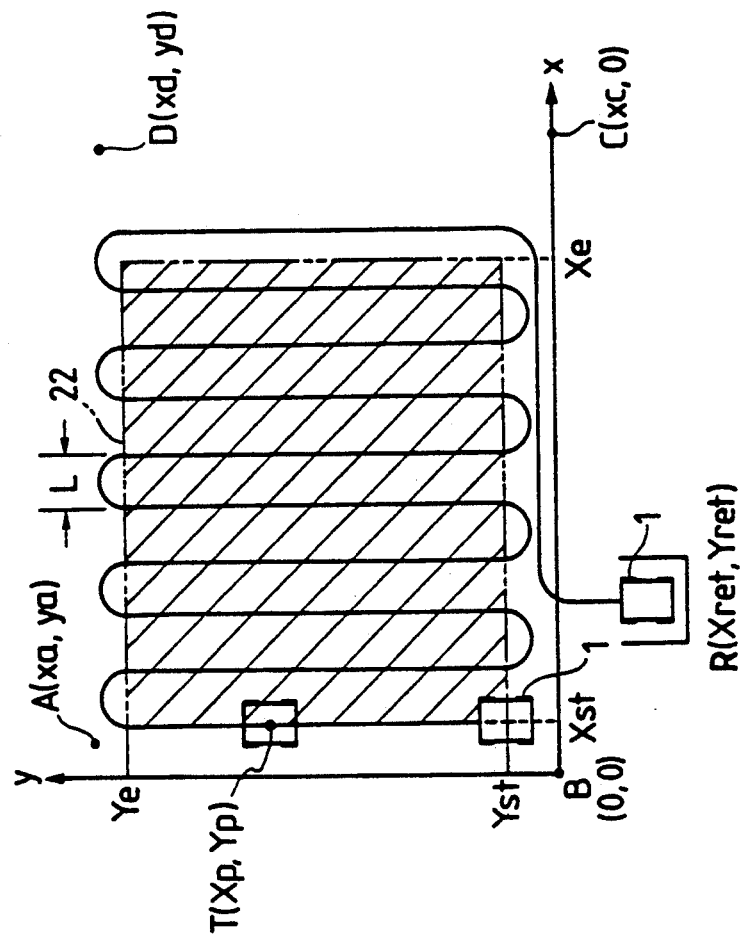
FIG. 9 is a graphical representation showing a situation of arrangement of a traveling course of a moving vehicle and reflectors.

Next steering control for the moving vehicle 1 based on the positional information of the moving vehicle 1 calculated in accordance with the above procedure will be described hereinbelow. FIG. 9 is a schematic diagram showing a traveling course of the moving vehicle 1 and the coordinates of the reflectors 6, and FIG. 3 is a flowchart illustrating a procedure for steering control.

In FIG. 9, points A, B, C and D indicate positions at which the reflectors 6a–6d are disposed, and the current position T and the working area 22 of the moving vehicle 1 are represented on a coordinate system wherein the point B is fixed as the origin, and a straight line extending between the points B and C is defined as the x-axis. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For the simple explanation, while an example wherein four sides of the working area 22 are parallel to the x- or y-axes is shown in FIG. 9, other directions and/or shapes of the working area may be selected so far as the points A–D are disposed around the working area 22.

In accordance with the flowchart shown in FIG. 3, a control procedure will be described hereinbelow in which it is assumed that the moving vehicle 1 reciprocates in parallel to the y-axis as in the traveling locus of FIG. 9, and the pitch therefor is L.

First of all, in step S1, the moving vehicle 1 is transferred by means of, for example, radio control from a point R to a position where working is to be started.

In step S2, the beam emitter 2 and the beam receiver 3 are rotated while stopping the moving vehicle 1 to detect the respective reference points A, B, C and D, and at the same time azimuths of the respective reference points viewed from the moving vehicle 1 are stored in the storing means 35.

In step S3, Xst is set as an X-coordinate Xn for a traveling course thereby to fix the traveling course.

Traveling of the moving vehicle 1 is started in step S4.

It is judged in step S5 whether or not reflected light from any reference point is received by the beam receiver 3. The step 5 is repeated until the reflected light is detected. Upon detecting the reflected light, the operation proceeds to step S6, and a subroutine process for discriminating reference points which will be described hereinafter is carried out.

In step S7, it is judged whether a reference point has been missed or not dependent upon the reference point-missing signal d output from the first comparing mean 32.

If the judgment in the step S7 is "NO", i.e. in the case where it is judged that no reference point among the reference points disposed at four positions has been successively missed over a predetermined number of times (threshold value T1), the procedure proceeds to step S8 where the position and the advance direction of the moving vehicle 1 are operated on the basis of the four reference points in the first operating means 34.

If the judgment in the step S7 is "YES", i.e. in the case where it is judged that a particular reference point among the reference points disposed ar four positions has been successively missed over a predetermined number of times (threshold value T1), the procedure proceeds to step S9 where the position and the advance direction of the moving vehicle 1 are operated on the basis of the remaining three reference points in the second operating means 13.

In step S10, a deviation amount of the traveling course ($\Delta X = Xp - Xn$, $\Delta\theta f$) is operated, and a steering angle is controlled in step S11 by the steering means 14 in response to the amount of deviation calculated.

In step S12, it is judged that either the moving vehicle 1 travels towards the direction going away from the origin (forward direction) or the direction approaching the origin (reverse direction) in the y-axial direction.

In case of forward direction, it is judged whether one stroke has been finished (Yp > Ye) or not in step S13, while in case of reverse direction it is judged whether one stroke has been finished (Yp < Yst) or not in step S14. When it is judged that one stroke has not been finished in either step S13 or step S14, processings in steps S5-S10 are repeated.

In case where it is judged that one stroke has been finished in either step S13 or S14, it is judged in the following step S15 whether all the strokes have been finished (Xp > Xe) or not.

When all strokes have not been finished, the procedure shifts from step S15 to step S16 to effect U-turn control of the moving vehicle 1. U-turn control is carried out in accordance with a different method from the one for steering control in a straight traveling course which is effected according to processing steps S10 and S11 wherein the positional information of the moving vehicle 1 operated by the first or the second operating means 34 or 18 is fed back to the steering means 14.

More specifically, it is adapted that the vehicle 1 is traveled while fixing a steering angle thereof at a predetermined angle in a turning course, and the moving vehicle returns to steering control in a straight traveling course which is effected in accordance with processings of steps S5-S11 at the time when at least one of azimuths of the respective reflectors 6 viewed from the vehicle 1 substantially falls in a predetermined range of a corresponding azimuth. The details of U-turn control for traveling the moving vehicle along the turning course is described in detail in U.S. patent application Ser. No. 362,630 now U.S. Pat. No. 4,947,324.

In step S17, a pitch L is added to Xn thereby operating (Xn+L) and the following traveling course is set. After setting the following traveling course, the procedure returns to step S5 and the above described processings are repeated.

When all strokes have been completed, the moving vehicle returns to the return position R(Xret, Yret) in step S18, and the travel thereof stops in step S19.

Next, the processing for discriminating reference points in the step S6 will be described hereinbelow.

In the present embodiment, measures for discriminating reference points are such that the respective reference points A-D are allowed to correlate with count values of the pole counter 27, for example, reference points A, B, C and D are allowed to correlate with count value 1, 2, 3 and 4, respectively, whereby the respective reference points are discriminated from one another. More specifically, the pole counter 27 outputs the count values 1, 2, 3 and 4 in that order in every detection of the reflected light 2R by the beam receiver 3 and the reference points can be discriminated by supervising the count values.

In the case when a reference point has been lost, or reflected light is received from an object other than the reference points, the reference points do not correlate with the count values. As the result, it can be recognized that a reference point has been lost, or reflected light is received from some object other than the reference points. Accordingly, in step S6 for discriminating reference points shown in the flowchart of FIG. 3, it is assumed that only the light detected within a predicted azimuth range is normal reflected light from an expected reference point. Under this assumption, in the processing in the step S6, it is judged whether or not the count values output from the pole counter 27 correspond to the reference points, and based on the result of the judgement it is concluded whether or not the expected reference points have been normally detected after all.

As a result of the above judgment, the position is continuously detected in accordance with the reference point-missing processing described hereinafter when it is judged that a reference point has been missed or/and it is judged that light beam had been received from any reflecting object other than the reference points. When the number of times in missing successively a particular one reference point exceeds a predetermined number of times, steering control of the moving vehicle 1 is continued on the basis of the informations of the three reference points other than the aforesaid particular one reference point. When the number of times in missing successively a plurality of reference points exceeds a predetermined number of times, travel of the moving vehicle 1 is adapted to stop.

Next, an example of a method for presuming azimuths of reference points in order to judge that detected light is from a prescribed reference point will be described hereinbelow in conjunction with the reference point A.

Figure 11:
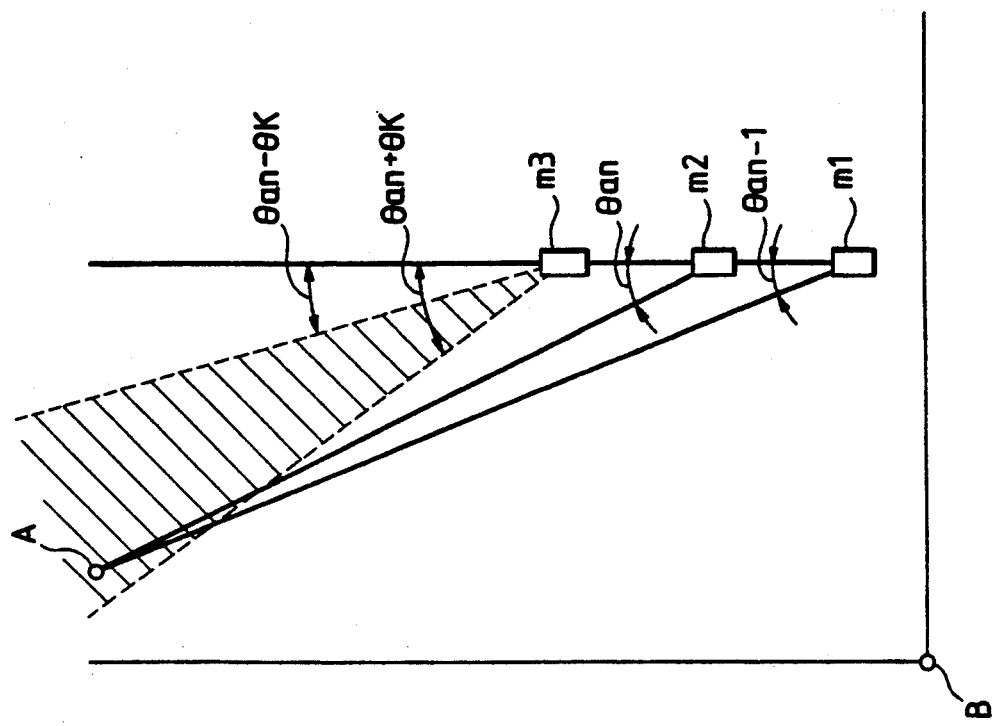
FIG. 11 is an explanatory view for explaining an azimuth of reference point.

FIG. 11 is a diagram showing changes in azimuth of the reference point A viewed from the moving vehicle during the travel thereof wherein it is assumed that the azimuth at the just previous detection cycle time when the moving vehicle 1 exists at the point m1 is $\theta an-1$, and the azimuth at the current detection cycle time when the moving vehicle 1 exists at the point m2 is $\theta an$. In these circumstances, it is predicted that the azimuth at the next detection cycle time when the moving vehicle 1 is expected to exist at the point m3 is ($\theta an \pm \theta K$) where $\theta K$ is a fixed value. In this case, the fixed value $\theta K$ is determined on the basis of an angle {$\theta an - (\theta an - 1)$} which is found experimentally.

According to the experiments by the present inventors, since {$\theta an - (\theta an - 1)$} falls within a range of about several degrees except for the case where the moving vehicle 1 is in the turning course, the fixed value $\theta K$ is set to 3 degrees in the present embodiment. However, the fixed value $\theta K$ is switched to a larger preset value than that in straight travel of the moving vehicle 1, because changes in the azimuth must be abrupt during turning of the moving vehicle 1. In the present embodiment, the fixed value $\theta K$ during turning of the moving vehicle 1 is set to 30 degrees. Either $\theta K$ may be set as such a fixed value which is based in the experiment as mentioned above, or a difference between two azimuths which were detected at the latest and the second latest detection cycle times and have been stored in the azimuth storing means 35 may be set as the value $\theta K$.

The method for predicting the azimuth of the reference point A has been described with referring to FIG. 11, and the azimuths of the other reference points B-D are similarly predicted.

The processing for discriminating reference points will be explained in accordance with the flowchart shown in FIG. 4 wherein an azimuth of an object, by which light is reflected, with respect to the advance direction of the moving vehicle 1 which was calculated on the basis of the latest beam signal received is read in as $\theta x$ in step S61.

In step S62, it is judged whether or not $\theta x$ is within a range of ($\theta an \pm \theta K$). If the judgment in the step S62 is "YES", the received beam signal is assumed to be a reflected signal from the reference point A and the operation proceeds to step S67.

In the step S67, it is judged whether or not the count value in the pole counter 27 is a value "4" corresponding to the reference point D which is to be detected before the detection of the reference point A. If the counted value is "4", the assumption made in the step S62 that "the received beam signal is a reflected signal from the reference point A" is considered to be right, so that the processes in steps S68 and S69 are performed, that is, the azimuth $\theta a$ of the reference point A viewed from the moving vehicle 1 is determined. The details of the processing for determining the azimuth angle $\theta a$ will be described hereunder in conjunction with FIG. 6A.

In the step S69, a count value in the pole counter 27 is set to be "1" corresponding to the reference point A. After that, the operation is returned to the step S7 in the main routine (FIG. 3).

On the other hand, if it is judged in the step S67 that the count value in the pole counter 27 is not "4", the operation proceeds to step S70 where it is judged whether or not the count value in the pole counter 27 is "3". If the judgment in the step S70 is "YES", it is judged that the reference point D has been lost immediately before, so that the operation proceeds to step S71 where the missing of the reference point D is processed.

Figure 5A:
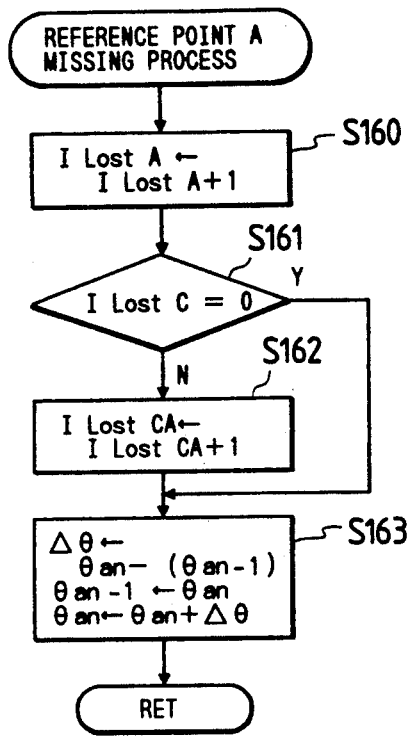
FIGS. 5A-5D is a flowchart showing a processing for reference points lost.
Figure 5B:
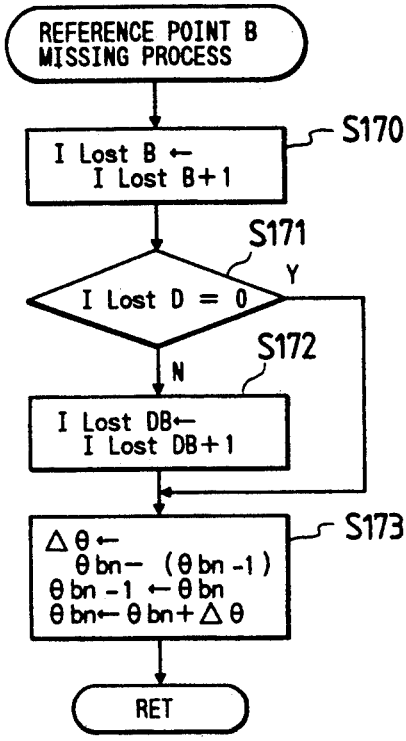
Figure 5C:
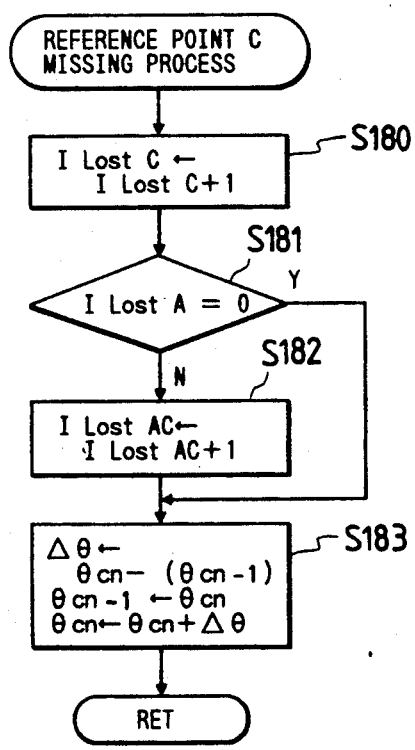
Figure 5D:
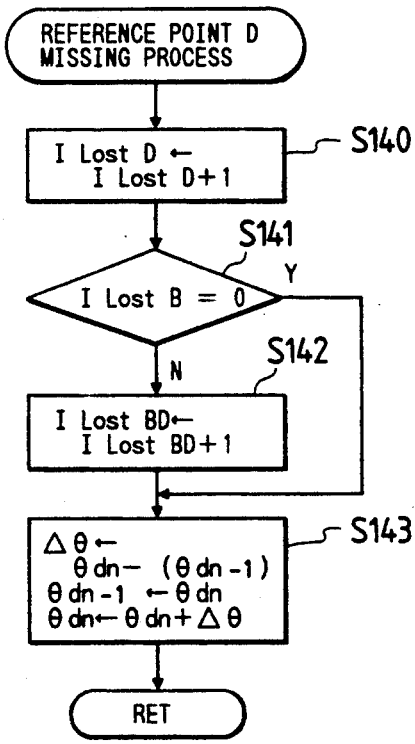

The details of the processing for the missing of the reference point D will be shown in FIG. 5D. After completing the processing for the missing of the reference point D, the operation proceeds to step S72.

In the step S72, it is judged whether or not a missing number of times I LostD for the reference point D exceeds the threshold value T1.

In the judgment in the step S72, when the missing number of times I LostD for the reference point D does not exceed the threshold value T1, the operation proceeds to the step S73 where it is judged whether or not the missing number of times I LostBD which shows that two adjoining reference points B and D have been lost exceeds the threshold value T2. When it does not exceed T2, the operation proceeds to the step S68. When it exceeds the threshold value T2, the operation proceeds to step S135 and the clutch 20 in the moving vehicle 1 is disconnected, the engine 19 is stopped, and a fail lamp is lit continuously or intermittently.

Moreover, in the step S72, when it is judged that the missing number of times for the reference point D, I LostD, has exceeded the threshold value T1, the procedure shifts to step S74 where "1" is set in a reference point D missing flag, and then the procedure proceeds to step S73.

When the judgment in the step S70 is "NO", the procedure proceeds to step S75 where it is judged whether the count value in the pole counter 27 is "2" or not.

If the judgment in the step S75 is "YES", it is considered that the reference points C and D have been missed, then, the procedure proceeds to step S76 where a reference point C missing processing similar to the reference point D missing processing is effected.

In step S77, it is judged whether or not the missing number of times for the reference point C, I LostC, exceeds the threshold value T1. In the case where the missing number of times for the reference point C, I LostC, does not exceed the threshold value T1, the procedure proceeds to step S78 to effect a missing processing for the reference point D.

It is judged in step S79 whether the missing number of times for the reference point D, I LostD, exceeds the threshold value T1 or not.

If the missing number of times for the reference point D, I LostD, does not exceed the threshold value T1, then, the procedure shifts to step S80 where "1" is added to a value of the number of times in missing successively the reference points C and D, i.e. I LostCD, and then the procedure proceeds to step S81 where it is judged whether or not the successively missing number of times for a plurality of reference points C and D, I LostCD, exceeds the threshold value T2. If the missing number of times I Lost0D does not exceed the threshold value T2, the procedure proceeds to step S68.

If the missing number of times I LostCD exceeds the threshold value T2, the procedure proceeds to step S135 where the clutch 20 is disconnected, the engine 19 is stopped, and a fail lamp is flashed.

When it is judged in the step S77 that the missing number of times for the reference point C, I LostC, has exceeded the threshold value Ti, the procedure shifts to step S82 where "1" is set in a reference point C missing flag, and then the procedure proceeds to step S78.

Moreover, in the step S79, when it is judged that the missing number of times for the reference point D, I LostD, has exceeded the threshold value T1, the procedure shifts to step S83 where "1" is set in the reference point D missing flag, and then the procedure proceeds to step S80.

When the judgment in step S75 is "NO", i.e. the case where a value of the pole counter is none of "4", "3" and "2", it is considered that three successive reference points at three positions have been missed. In this case, the procedure proceeds immediately to step S135 where the clutch 20 is disconnected, the engine 19 is stopped, and a fail lamp is flashed.

When it is judged in the step S62 that the received beam signal is not within a range of ($\theta an \pm \theta K$), the operation proceeds to step S63 where it is judged whether or not the received beam signal is within the range of ($\theta bn \pm \theta K$).

When it is judged that the received beam signal is detected within a range of $\theta bn \pm \theta K$, in other words, the received beam signal is one derived from the reflected light from the reference point B, the procedure proceeds to step S84 where it is judged whether the value of the pole counter is "1" or not. When the judgment in step S84 is "NO", the procedure proceeds to step S87, while it proceeds to step S85 in the case where the judgment is "YES". Thereafter, the processings for step S86 as well as steps S88-S100 are carried out.

When the judgment in step S63 is "NO". the procedure proceeds to step S64 where it is judged whether or not the received beam signal is detected within a range of $\theta cn \pm \theta K$.

When it is judged that the received beam signal is detected within the range of $\theta cn \pm \theta K$, i.e. the received beam signal is the one derived from the reflected light from the reference point C, the procedure proceeds to step S101 where it is judged whether the value of the pole counter is "2" or not. When the judgment therein is "NO", the procedure proceeds to step S104, whilst it proceeds to step S102 if the judgment therein is "YES". Thereafter, the processings for step S103 or steps S105–S117 are effected.

When the judgment in step S64 is "NO", the procedure proceeds to step S65 where it is judged whether or not the received beam signal is detected within the range of $\theta dn \pm \theta K$. When the received beam signal is detected within the range of $\theta dn \pm \theta K$, i.e. the received beam signal is the one derived from the reflected light from the reference point D, the procedure proceeds to step S118 where it is judged whether the value of the pole counter is "3" or not.

If the judgment is "NO", the procedure proceeds to step S121, whilst it proceeds to step S119 when the judgment is "YES". Thereafter, the processings for step S120 or steps S122–S134 are carried out.

When all the judgments in the steps S62, S63, S64 and S65 are "NO", the received light beam is none of the reflected light from the reference points A, B, C and D, and as a result it is considered that the received beam signal is either a signal induced by the reflected light from reflecting bodies other than the reference points or a signal as a result of receiving the light from an irrelevant beam source so that such beam signal is processed as a noise.

When it is judged the received beam signal is the noise, the operation proceeds from the step S65 to the step S66 and hence, a noise warning lamp is lit, and the coordinates of the moving vehicle 1 at the time when the noise was detected as well as the azimuth of that noise source viewed from the moving vehicle 1 are read in and the values thereof are stored in the noise storing means 29.

As is shown in the flowchart of FIG. 4, the present embodiment is so constructed that when each of the reference points A, B, C and D has been missed over the number of times as to the threshold value T1, "1" is set in a corresponding one of the reference point missing flags. When the state of any one of the reference point missing flags is "1", the switching means 36 is switched to the side shown in FIG. 1 so that the position and the advance direction of the moving vehicle 1 are calculated on the basis of positional informations, differential azimuths and azimuth angles of remaining three reference points.

It is to be noted that since processings in the steps S85–S100, S102–S117, and S119–S134 are carried out in the same manner as that of the above-mentioned steps S68–S83, the detailed explanation therefor is omitted.

Next, the above described reference point missing processing and a processing for determining azimuths $\theta a$–$\theta d$ of reference points viewed from the moving vehicle 1 will be described by referring to the flowcharts shown in FIGS. 5 and 6, respectively.

FIG. 5A is a flowchart illustrating the reference point A missing processing (step S88) in which, since it is judged in the step S87 that the reference point A has been missed, "1" is added to the missing number of times for the reference point A, I LostA, in step S160.

In step S161, it is judged whether or not the missing number of times for the reference point C, I LostC, is "0", in other words, whether or not the reference point C had been missed. In the case where the reference point C had not been missed, the operation shifts to the step S163, while when the reference point C had been missed, this means missing of both the reference points C and A so that the procedure proceeds to step S162 to add "1" to the missing number of times for the adjoining reference points C and A, I LostBD.

In step S163, a difference $\{\theta an - (\theta an - 1)\}$ between a pair of the azimuths of the reference point A which have been detected in the last detection cycle and the current detection cycle are read as $\Delta\theta$, so that the azimuths $\theta an - 1$ detected in the before-last detection cycle and $\theta an$ detected in the last detection cycle are renewed by the $\theta an$ and $(\theta an + \Delta\theta)$, respectively. The difference $\Delta\theta$ between the aforesaid azimuths is not limited to a result obtained by calculating $\{\theta an - (\theta an - 1)\}$, but a fixed value which has been set previously based on a value found by an experiment may be used as $\Delta\theta$.

When a particular reference point can not be detected within an expected range, the azimuth data of the particular reference point are presumed and renewed by the missing processing as described above on the basis of the azimuth data in the last and the before-last detection cycles, and then the current position and the advance direction of the moving vehicle 1 are calculated on the basis of the renewed data.

Figure 6A:
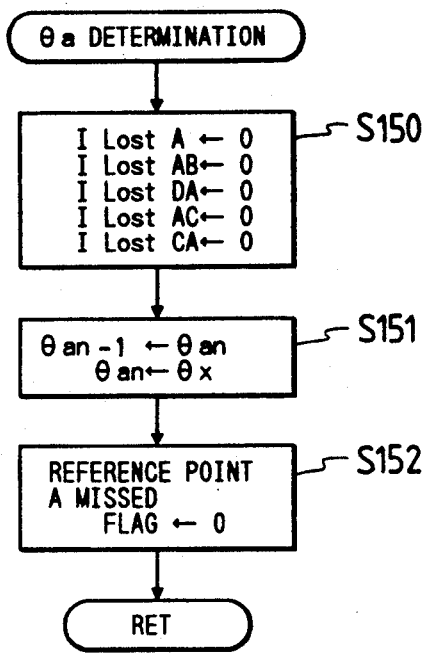
FIGS. 6A-6D is a flowchart showing a processing for determining azimuth.
Figure 6B:
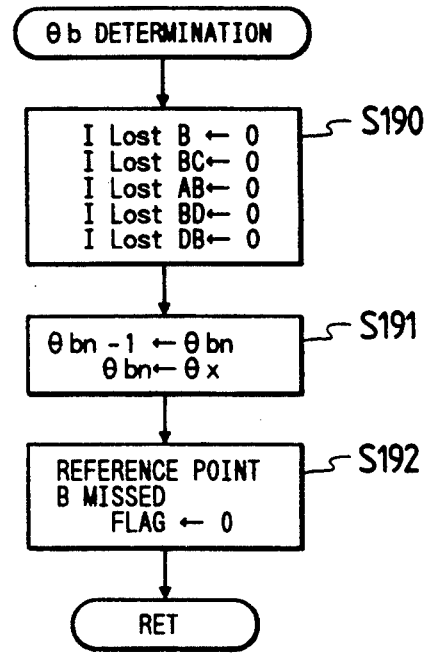
Figure 6C:
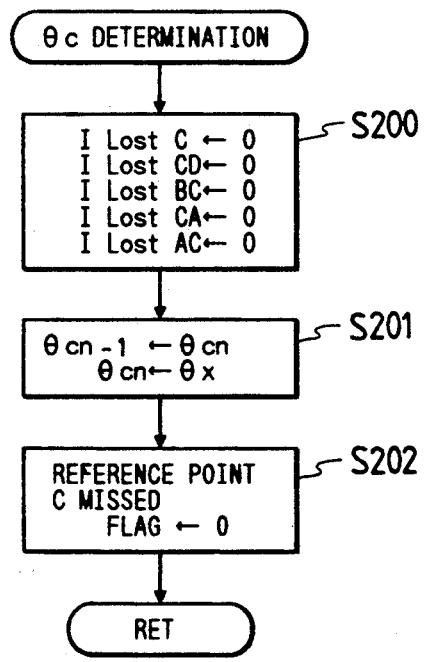
Figure 6D:
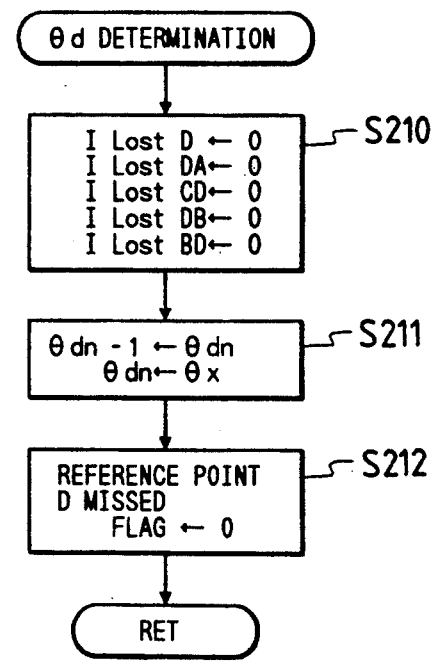

Missing processings for the other reference points B, C and D are also similarly effected as for the reference point A as seen in FIGS. 6B–6D.

FIG. 6A is a flowchart showing in detail the step S68 (FIG. 4) for determination of the azimuth $\theta a$ of the reference point A.

In step S150, "0" is set as the missing number of times of the reference point A, I LostA, in the missing number of times counter 30, and at the same time, "0"s are set as the numbers of times I LostAB, I LostDA, I LostAC and I LostCA in the plural missing number of times counter 31, respectively. In step S151, the azimuths $\theta an$ detected in the last detection cycle and $\theta x$ detected in the current detection cycle are read in as $\theta an - 1$ and $\theta an$, respectively, to renew the data.

In step S152, "0" is set to the reference point A missing flag. As a result, the switching means 36 is turned over to the side which is opposite to that shown in FIG. 1, and the position as well as the advance direction of the moving vehicle 1 are operated by the first operating means 34.

The azimuth $\theta a$ of the reference point A is determined as described above. Processings for determining the azimuths $\theta b$, $\theta c$ and $\theta d$ of the reference points B, C and D are shown in FIGS. 6B–6D, respectively. Since the procedures for these processings are the same as that of the processing for determining the azimuth $\theta a$ of the reference point A, the explanation therefor will be omitted.

In accordance with the present embodiment, as described above, when light is detected by the beam receiver 3, it is discriminated whether or not light is the one which is reflected by one of the reflectors 6a–6d located at the expected reference points. In only the case where the light is the relevant one reflected by one of the expected reflectors 6, the position and the advance direction of the moving vehicle 1 are calculated on the basis of the beam signal received.

In the case where the light reflected by the particular reflector is not received and the particular reference point has been lost, the azimuth of the particular reference point lost is presumed on the basis of the azimuths at which the beam signals had been detected in the last and the before-last detection cycles, respectively, and the position as well as the advance direction of the moving vehicle 1 are calculated in accordance with the data on the presumed reference points. However, when the successively missing number of times for one particular reference point is more than the predetermined number of times, the position of the moving vehicle 1 is detected based on the informations of the three reference points other than the particular reference point, whereby steering control for the moving vehicle 1 can be continued.

Furthermore, when two reference points are successively missed, it is presumed that there is a serious trouble so that travel of the moving vehicle 1 is allowed to stop at the time when the missing number of times has exceeded a prescribed number of times.

Moreover, while the moving vehicle 1 is adapted to stop at once in the case where it is judged that three reference points have been missed in the present example, it may be arranged alternatively that a predetermined number of times has been previously set for the case where three reference points has been successively missed, and then the moving vehicle 1 is allowed to stop after the missing number of times has exceeded the predetermined number of times.

As described above, according to the present embodiment, even if the reflected light from a reference point is not normally detected because of a tentative trouble, travel of the moving vehicle 1 can be continued along a prescribed traveling course by presuming of the position of such reference point.

When the successively missing number of times for a particular reference point reaches such a number of times that normal steering control cannot be expected as a result of accumulating errors in presumption of the reference points, in other words, when such missing number of times exceeds the threshold value T1, the control is effected on the basis of three reference points so that there is no possibility that an error in the detected position of the moving vehicle 1 is increased.

On the one hand, when it is judged that the trouble is not tentative, but serious one, in other words, when a plurality of reference points have been successively missed, travel of the moving vehicle 1 is allowed to stop in an early stage so that the moving vehicle 1 does not deviate from a predetermined course.

While missing processing is effected or the moving vehicle 1 is allowed to step when the reference point or points have been missed by the prescribed number of times in the present example, such missing processing may be effected or the moving vehicle 1 may be stopped where reference point or points have been missed during a prescribed period of time or during travel of the moving vehicle 1 by a predetermined distance.

Furthermore, although the present embodiment is so constructed that when the light reflected by a particular reflector is not received so that the reference point was lost, an azimuth of the reference point lost is presumed on the basis of the azimuths which have been obtained by detecting beam signals received in the last and the before-last detection cycles, respectively, and the position and the advance direction of the moving vehicle 1 are calculated in accordance with the presumed reference point, it may be so constructed that the azimuth is presumed, thereafter the presumed azimuth is used only for the detection of the reference point in the next cycle, the calculation for the position and the advance direction of the moving vehicle 1 in this cycle is cancelled, and travel of the vehicle is continued in the same advance direction as in the last cycle without any modification.

While the moving vehicle 1 has been adapted, in the present embodiment, to be driven by the radio control or the like from a returning position R to a starting position for working, it may be so constructed that the light beam is scanned while the moving vehicle 1 stays at the returning position R to detect the azimuths of the reference points, and a traveling course extending from the returning position R to the starting position for working is operated on the basis of the detected azimuths, whereby the moving vehicle 1 is allowed to travel to the starting position for working along the operated traveling course. In this case, it is preferable to perform the discrimination process of the reference points during traveling from the returning position to the starting position for working.

Although the present embodiment is one in which the present invention has been applied to a system wherein the position and the advance direction of the moving vehicle 1 are detected on the basis of four reference points thereby effecting steering control, the present invention is not limited thereto, but applicable also to a system wherein reference points positioned at the apexes of a triangle surrounding the moving vehicle 1 are detected among four reference points, the position and the advance direction of the moving vehicle 1 are detected on the basis of the positional information on the above three reference points thereby effecting steering control, and such system is described in the U.S. application Ser. No. 413,934 (Japanese Patent Application No. 63-262191).

More specifically, the system according to the present invention may be so constructed that when one reference point has been missed, the position and the advance direction of the moving vehicle 1 are detected on the basis of three reference points which are not limited to the reference points positioned at the apexes of a triangle surrounding the moving vehicle 1 among four reference points, but on the basis of the three reference points other than the one missed, whereby steering control of the moving vehicle 1 is carried out.

As is apparent from the above description, the following advantages can be attained in accordance with the present invention.

(1) When one reference point has been missed, since steering control for the moving vehicle can be continued, not on the basis of presumption of the missed reference point but on the basis of the three reference points other than the one missed, precision in detecting the position of the moving vehicle is increased as compared with the presumption of the missed reference point.

(2) Since it may be adapted to stop the moving vehicle only when a plurality of reference points were frequently missed, there is no useless interruption of working so that its working efficiency is improved.

(3) In the case of missing tentatively one particular reference point, traveling of the moving vehicle can be continued by the control based on the remaining three reference points, while when the missed reference point can be again detected, the moving vehicle control may be switched to that based on the four reference points, whereby the moving vehicle may be traveled as before. Thus, the position of the moving vehicle can be accurately detected even in a working area under such a poor condition that the moving vehicle is somewhat rolled, so that an applicable range can be expanded for moving vehicles.

What is claimed is:

1. A position-detecting system for a moving vehicle that is adapted to travel through a working area whose boundaries are defined by light reflectors disposed at four spaced reference points none of which reflectors carries any identification information regarding the position of said reflector, said vehicle including a light source that scans a light beam horizontally around a fixed axis on said vehicle, said vehicle including light-receiving means disposed at said fixed axis for receiving light reflected by said light reflectors, and said vehicle also including control means for detecting the position of said moving vehicle on the basis of signals derived from reflected light received by said light receiving means, said control means comprising:

means for detecting the azimuths of said reference points with respect to the advance direction of the moving vehicle based on light-receiving intervals of the light-receiving means;

first operating means for operating the position of the moving vehicle on the basis of preset positional information as well as the azimuths of the reference points;

second operating means for operating the position of the moving vehicle on the basis of preset positional information and the azimuths of any three reference points out of said four reference points;

discrimination processing means having means for outputting a reference point-missing signal when a light beam signal is not detected from one of the four reference points; and a switching means responsive to occurrence of said reference-point missing signal for transferring control from said first operating means to said second operating means to allow the second operating means to operate the position of the moving vehicle on the basis of the positional information as well as the azimuths of the three reference points other than the reference point that was missed.

2. A position-detecting system for a moving vehicle as claimed in claim 1 wherein the discrimination processing means is provided with means for comparing the number of times the light beam signal from a particular reference point has not been detected successively with a predetermined threshold value, said reference point-missing signal being output when said number of times exceeds said threshold value.

3. A position-detecting system for a moving vehicle as claimed in claim 1 wherein the discrimination processing means is provided with means for predicting a direction of the reference point to be detected in a succeeding scanning cycle based on the azimuths detected by the azimuth detecting means, and means for presuming a direction of the reference point which is to be detected but has not been detected when the reference point to be detected in the succeeding scanning cycle was not detected in the predicted direction.

4. A position-detecting system for a moving vehicle as claimed in claim 1 wherein the first operating means operates the position of the moving vehicle on the basis of the azimuths of the four reference points, differential azimuths defined between two pairs of the reference points positioned diagonally relative to each other among four reference points, and the positional information of the four reference points.

5. A position-detecting system for a moving vehicle as claimed in claim 1 wherein the first operating means operates the position of the moving vehicle on the basis of the azimuths or three of said four reference points positioned at the apexes of a triangle surrounding the moving vehicle the differential azimuths between adjoining two reference points viewed from the moving vehicle, and the positional information of the three reference points.

* * * * *